United States Patent
Zhang et al.

(10) Patent No.: US 7,599,707 B2
(45) Date of Patent: Oct. 6, 2009

(54) METHOD AND SYSTEM FOR CONTROLLING TRANSMISSION POWER OF A DOWNLINK SIGNALING CHANNEL BASED ON ENHANCED UPLINK TRANSMISSION FAILURE STATISTICS

(75) Inventors: Guodong Zhang, Farmingdale, NY (US); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 707 days.

(21) Appl. No.: 11/116,017

(22) Filed: Apr. 27, 2005

(65) Prior Publication Data
US 2005/0255873 A1    Nov. 17, 2005

Related U.S. Application Data

(60) Provisional application No. 60/567,308, filed on Apr. 30, 2004.

(51) Int. Cl.
*H04B 7/00* (2006.01)
(52) U.S. Cl. .................. 455/522; 455/69; 370/318
(58) Field of Classification Search ............ 455/69, 455/522, 63.1, 67.13; 370/318
See application file for complete search history.

(56) References Cited

U.S. PATENT DOCUMENTS

| | | | |
|---|---|---|---|
| 6,473,624 B1 | 10/2002 | Corbett et al. | |
| 6,934,556 B2 * | 8/2005 | Takano | 455/522 |
| 2002/0115464 A1 * | 8/2002 | Hwang et al. | 455/522 |
| 2002/0136193 A1 * | 9/2002 | Chang et al. | 370/347 |
| 2002/0177462 A1 | 11/2002 | Cao et al. | |
| 2003/0219037 A1 | 11/2003 | Toskala et al. | |
| 2003/0228876 A1 | 12/2003 | Hwang | |
| 2004/0162083 A1 * | 8/2004 | Chen et al. | 455/454 |

(Continued)

FOREIGN PATENT DOCUMENTS

EP    1 418 786    8/2003

(Continued)

OTHER PUBLICATIONS

3GPP2 C.S0002-C, "Physical Layer Standard for cdma2000 Spread Spectrum Systems", $3^{rd}$ Generation Partnership Project 2 "3GPP2", Version 2.0, Revision C, Jul. 23, 2004.

(Continued)

*Primary Examiner*—Raymond S Dean
(74) *Attorney, Agent, or Firm*—Volpe and Koenig PC

(57) ABSTRACT

A method and system for controlling the transmission power of at least one downlink (DL) enhanced uplink (EU) signaling channel such that enhanced dedicated channel (E-DCH) DL signaling is delivered efficiently and reliably. The system includes at least one wireless transmit/receive unit (WTRU), at least one Node-B and a radio network controller (RNC). At least one of the WTRU and the Node-B compute EU transmission failure statistics on the DL EU signaling channel and report the EU transmission failure statistics to the RNC. The RNC then adjusts a transmission power offset of the DL EU signaling channel to be used in determining transmission power level of the DL EU signaling channel at the Node-B based on the EU transmission failure statistics.

20 Claims, 2 Drawing Sheets

U.S. PATENT DOCUMENTS

2004/0258096 A1* 12/2004 Yoon et al. .............. 370/498
2004/0259528 A1* 12/2004 Gandhi et al. .............. 455/411
2005/0182995 A1* 8/2005 Curcio et al. .............. 714/748
2005/0207359 A1* 9/2005 Hwang et al. .............. 370/278

FOREIGN PATENT DOCUMENTS

WO     03/049320     6/2003

OTHER PUBLICATIONS

3GPP2 C.20003-C, "Medium Access Control (MAC) Standard for cdma2000 Spread Spectrum Systems", $3^{rd}$ Generation Partnership Project 2 "3GPP2", Version 2.0, Release C, Aug. 2004.

3GPP2 C.S0004-C, "Signaling Link Access Control (LAC) Standard for cdma2000 Spread Spectrum Systems", $3^{rd}$ Generation Partnership Project 2 "3GPP2", Version 2.0, Revision C, Jul. 23, 2004.

3GPPP2 C.S0005-C, "Upper Layer (Layer 3) Signaling Standard for cdma2000 Spread Spectrum Systems", $3^{rd}$ Generation Partnership Project 2 "3GPP2", Version 2.0, Revision c, Jul. 23, 2004.

3GPP TS 25.321 V6.4.0 (Mar. 2005), $3^{rd}$ Generation Partnership Project; Technical Specification Group Radio Access Network; Medium Access Control (MAC) Protocol Specification (Release 6).

3GPP TS 25.308 V6.1.0 (Mar. 2004), $3^{rd}$ Generation Partnership Project; Technical Specification Group Radio Access Network; High Speed Downlink Packet Access (HSDPA); Overall Description; Stage 2 (Release 6).

3GPP TS 25.308 V6.3.0 (Dec. 2004), $3^{rd}$ Generation Partnership Project; Technical Specification Group Radio Access Network; High Speed Downlink Packet Access (HSDPA); Overall Description; Stage 2 (Release 6).

3GPP TS 25.309 V6.2.0 (Mar. 2005), $3^{rd}$ Generation Partnership Project; Technical Specification Group Radio Access Network; FDD Enhanced Uplink; Overall Description; Stage 2 (Release 6).

3GPP TS 25.321 V6.1.0 (Mar. 2004), $3^{rd}$ Generation Partnership Project; Technical Specification Group Radio Access Network; Medium Access Control (MAC) Protocol Specification (Release 6).

\* cited by examiner

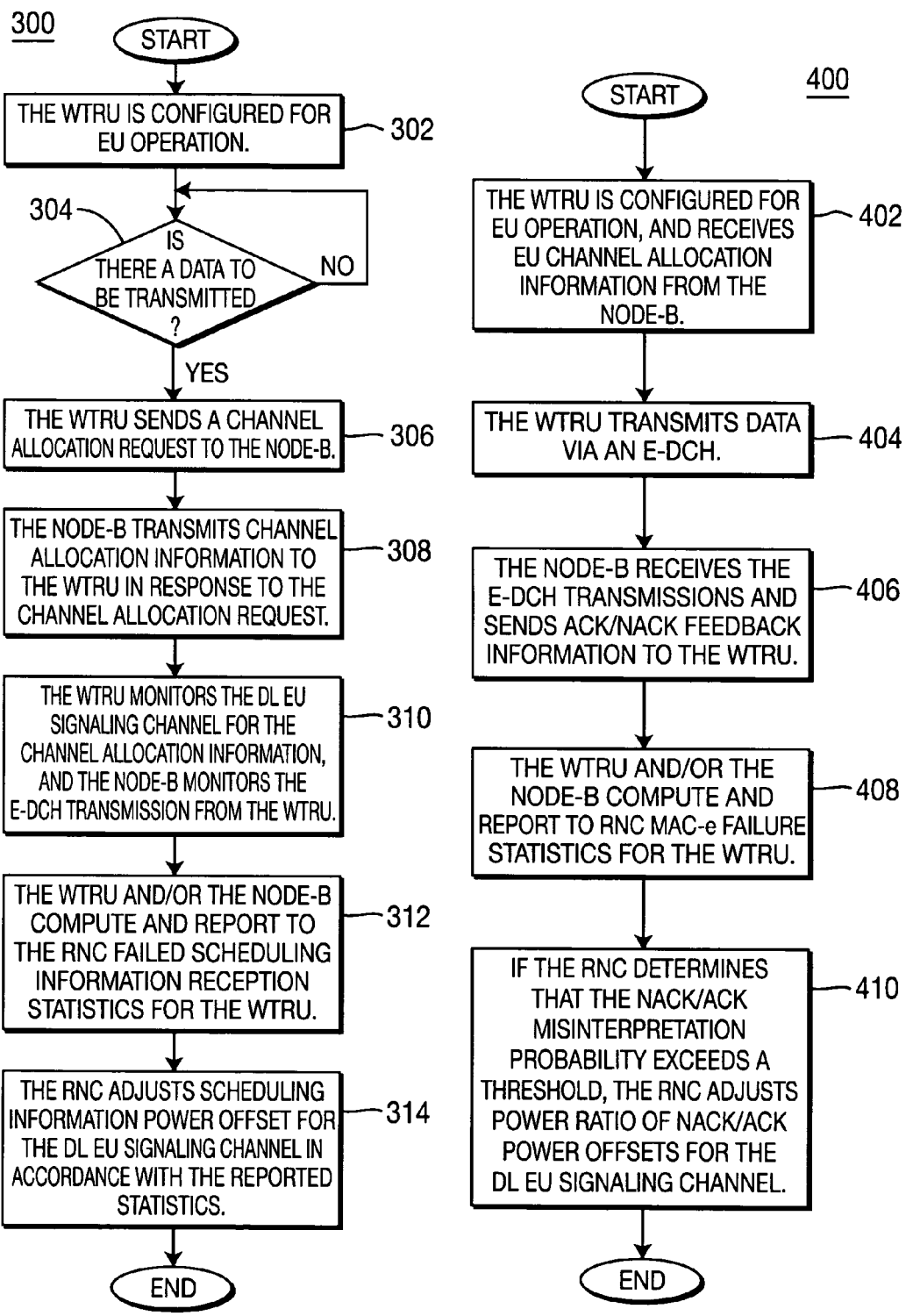

US 7,599,707 B2

METHOD AND SYSTEM FOR CONTROLLING TRANSMISSION POWER OF A DOWNLINK SIGNALING CHANNEL BASED ON ENHANCED UPLINK TRANSMISSION FAILURE STATISTICS

CROSS REFERENCE TO RELATED APPLICATION

This application claims the benefit of U.S. Provisional Application No. 60/567,308 filed Apr. 30, 2004, which is incorporated by reference as if fully set forth.

FIELD OF INVENTION

The present invention is related to a wireless communication system including a wireless transmit/receive unit (WTRU), at least one Node-B and a radio network controller (RNC). More particularly, the present invention is a method and system for controlling transmission power of a downlink (DL) enhanced uplink (EU) signaling channel based on EU transmission and scheduling information reception failure statistics reported to the RNC by the WTRU and/or the Node-B such that enhanced dedicated channel (E-DCH) downlink signaling channels are more reliable.

BACKGROUND

Methods for improving uplink (UL) coverage, throughput, and transmission latency are currently being investigated in Release 6 of the Third Generation Partnership Project (3GPP). In order to achieve these goals, the Node-B will take over responsibility of scheduling and assigning uplink resources to WTRUs. The Node-B can make more efficient decisions and manage UL radio resources on a short-term basis better than the RNC, even if the RNC retains coarse overall control.

A new media access control (MAC) function/entity for enhanced uplink (EU) called MAC-e is created in a WTRU and the Node-B to handle the transmission and reception of the E-DCH transmissions. To properly support EU, information such as channel allocations, transmission feedback, (i.e., acknowledge (ACK) or non-acknowledge (NACK)), and other feedback information, (such as power control command or channel quality), must be transmitted to the WTRU via a DL EU signaling channel efficiently and reliably.

Power control on the shared DL EU signaling channel is essential to support proper operation of the DL EU signaling channel. Power control reduces overall interference and therefore results in more efficient use of radio resources.

SUMMARY

The present invention is a method and system for controlling transmission power of at least one DL EU signaling channel such that E-DCH DL signaling is delivered to the WTRU efficiently and reliably. For DL signaling dedicated to specific WTRUs, the transmit power of DL EU signaling channels is based on the current DL dedicated control channel power plus a power offset. For DL signaling common to multiple WTRUs, the transmit power of DL EU signaling channels is based on a power set by the RNC plus a power offset. The RNC monitors EU transmission failure statistics reported from the Node-B and the WTRU to estimate the NACK to ACK misinterpretation statistics.

The Node-B reports the statistics of EU transmission failures at the Node-B to the RNC and the WTRU reports the statistics of EU transmission failures at the WTRU to the RNC. The RNC then adjusts the NACK to ACK power ratio according to the estimated NACK to ACK misinterpretation statistics. The Node-B computes failed scheduling information, (i.e., channel allocation information), reception statistics by detecting when the WTRU does not initiate EU transmissions after the Node-B sends channel allocation information to the WTRU, or the data rate/frequency of E-DCH transmissions is not the same as specified in the channel allocation information.

The WTRU may also compute failed scheduling information reception statistics by detecting when there is no response to EU channel allocation requests within a specified time period following the request. The RNC monitors failed scheduling information reception statistics reported by the WTRU and the Node-B to estimate statistics of scheduling information reception error. The RNC adjusts the power offset of the scheduling information field based on the statistics of scheduling information reception failure.

BRIEF DESCRIPTION OF THE DRAWINGS

A more detailed understanding of the invention may be had from the following description of a preferred embodiment, given by way of example and to be understood in conjunction with the accompanying drawing wherein:

FIG. 3 is a flow diagram of a process for implementing transmission power control on a DL EU signaling channel in accordance with one embodiment of the present invention; and FIG. 4 is a flow diagram of a process for implementing transmission power control on a DL EU signaling channel in accordance with another embodiment of the present invention.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
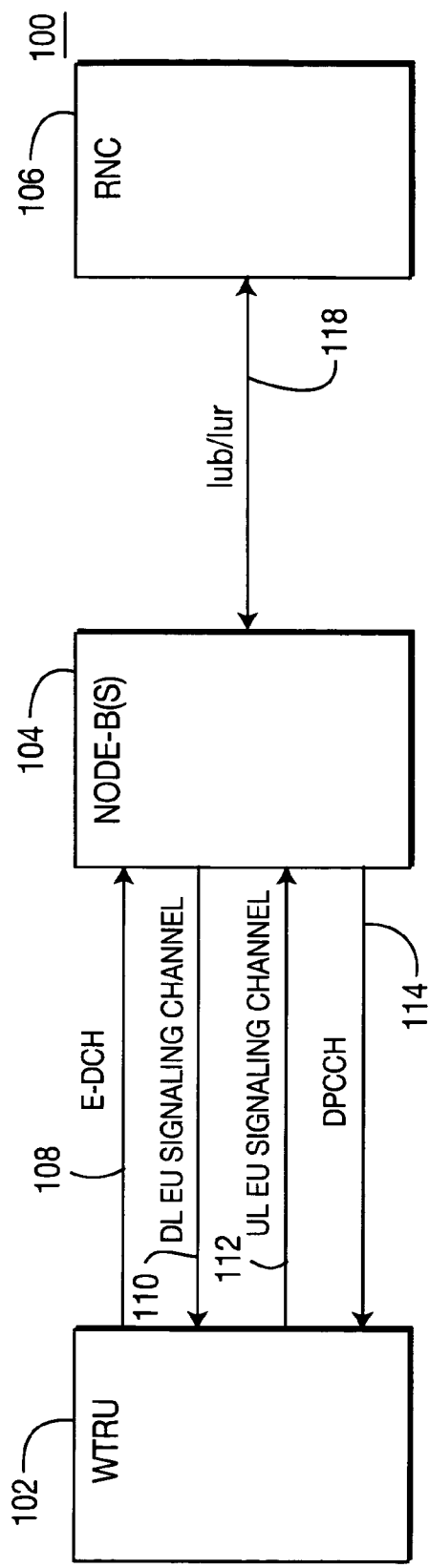
FIG. 1 is a block diagram of a wireless communication system in accordance with the present invention.

FIG. 1 is a block diagram of a wireless communication system 100 in accordance with the present invention. The system 100 comprises a WTRU 102, at least one Node-B 104 and an RNC 106. The RNC 106 controls overall EU operation by configuring EU parameters for the Node-B 104 and the WTRU 102 such as initial transmission power level, maximum allowed EU transmission power or available channel resources per Node-B. Between the WTRU 102 and the Node-B 104, a dedicated physical control channel (DPCCH) 114, an E-DCH 108, a UL EU signaling channel 112 and DL EU signaling channel 110 are established.

For E-DCH transmissions, the WTRU 102 sends an E-DCH allocation request to the Node-B 104 via either the E-DCH 108 or the UL EU signaling channel 112. In response, the Node-B 104 sends channel allocation information to the WTRU 102 via a DL EU signaling channel 110. After EU radio resources are allocated for the WTRU 102, the WTRU 102 transmits data via the E-DCH 108. In response to the E-DCH transmissions, the Node-B 104 sends an ACK or NACK for hybrid-automatic repeat request (H-ARQ) operation via the DL EU signaling channel 110.

When the WTRU 102 is configured to operate on the E-DCH 108 by the RNC 106, the power offset of each information field, (e.g., ACK/NACK, scheduling information, etc.), transmitted via the DL EU signaling channel 110 is also configured by the RNC 106 and signaled to the Node-B 104 via Iub/Iur 118. Those initial power offsets are determined by the RNC 106 based on the required error probability of information fields. During the operation of the E-DCH 108, the power offsets of information fields in the DL EU signaling channel 110 need to be adjusted according to the actually experienced quality of service of the DL EU signaling channel 110.

For DL signaling dedicated to specific WTRUs 102, the transmit power of the DL EU signaling channel(s) 110 is based on the current DL dedicated control channel power plus a power offset. For DL signaling common to multiple WTRUs 102, the transmit power of DL EU signaling channels 110 is based on a power level set by the RNC 106 plus a power offset.

For each WTRU 102, the transmission power of the DL EU signaling channel 110 is controlled separately. The transmission power of the DL EU signaling channel 110 for a specific WTRU 102 is determined as the transmission power of the DL dedicated physical control channel (DPCCH) 114 of the WTRU 102 plus a power offset. In this sense, the power of DPCCH is used as reference. The transmission power of the DPCCH of the WTRU 102 is controlled as in Release 99/4/5 of the universal mobile telecommunication services (UMTS).

Different power offsets are used depending on the information, (i.e., ACK/NACK, channel quality feedback, scheduling information, etc.), to be sent by the Node-B 104. For the ACK/NACK information field, a higher power offset is used to transmit NACK than to transmit ACK, because NACK to ACK misinterpretation causes a more serious problem than ACK to NACK misinterpretation.

Figure 2:
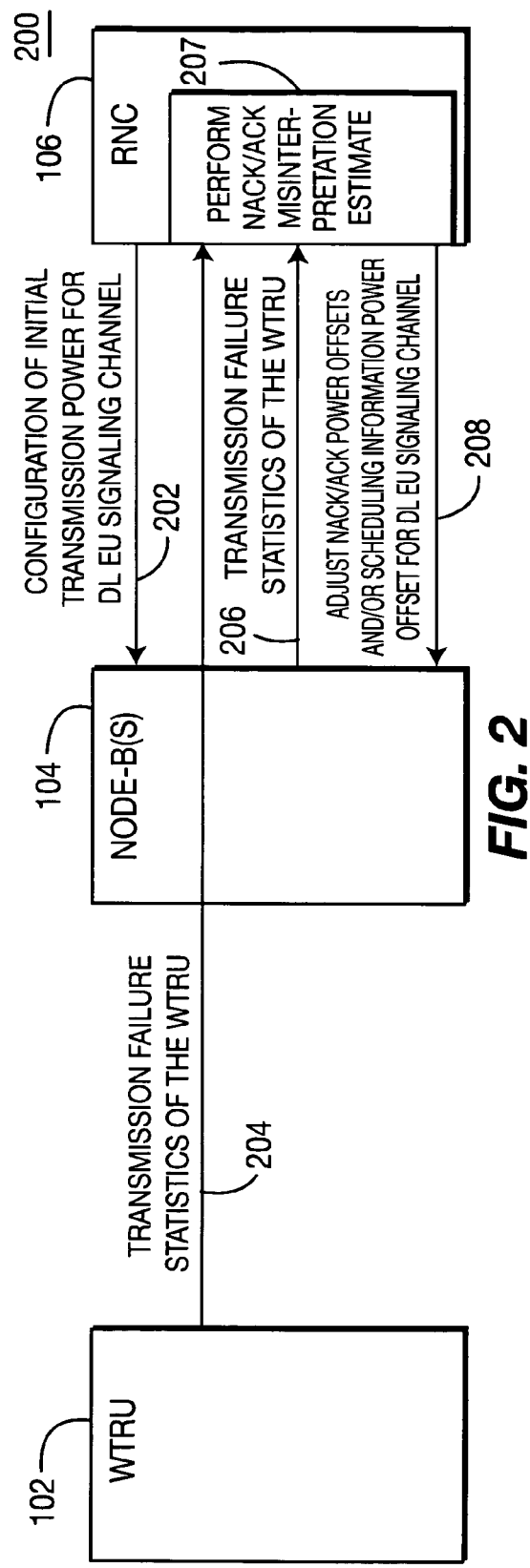
FIG. 2 is a signaling diagram between components of the system of FIG. 1 for implementing transmission power control on a DL EU signaling channel in accordance with the present invention.

FIG. 2 is a signaling diagram of a process 200 implemented by the system 100 for implementing transmission power control on a DL EU signaling channel 110 in accordance with the present invention. The RNC 106 sends an initial configuration of power offsets for the DL EU signaling channel 110 to the Node-B 104 (step 202). The RNC 106 monitors failed MAC-e transmissions and/or failed channel allocation information reception statistics reported by the WTRU 102 and/or the Node-B 104 to estimate the error probability of the reception and transmission on the DL EU signaling channel 110 (steps 204, 206). In step 207, the RNC 106 estimates the statistics of NACK to ACK misinterpretation based on the reported failed MAC-e transmissions statistics. If the estimate of statistics of NACK to ACK misinterpretation is higher than a threshold, the RNC 106 adjusts the NACK to ACK power ratio, (i.e., the ratio of power offsets), for the DL EU signaling channel 110 accordingly. Based on failed channel allocation information reception statistics received from the WTRU 102 and the Node-B 104, the RNC 106 adjusts the power offset of the scheduling information field accordingly (step 208). In this way, proper operation of EU is maintained and radio resources are used efficiently.

FIG. 3 is a flow diagram of a process 300 for controlling the transmission power of a DL EU signaling channel in accordance with one embodiment of the present invention. The WTRU 102 is configured for EU operation (step 302). The WTRU 102 determines whether there is a data to be transmitted via the E-DCH 108 (step 304). If there is data to be transmitted, the WTRU 102 sends a channel allocation request to the Node-B 104 via either the E-DCH 108 or the UL EU signaling channel 112 (step 306). The Node-B 104 receives the request and sends channel allocation information to the WTRU 102 via the DL EU signaling channel 110 (step 308).

After sending the channel allocation request, the WTRU 102 monitors the DL EU signaling channel 110 for channel allocation information. The Node-B 104 also monitors E-DCH transmissions after sending the channel allocation information via the DL EU signaling channel 110 (step 310).

The channel allocation information sent to the WTRU 102 may not be delivered successfully. The consequence of failed transmission of the channel allocation information depends on the way that the allocation is performed. For deterministic allocation, the WTRU 102 will not transmit at all. For statistical allocation, the WTRU 102 either may not transmit at all, or may transmit the data at a rate and/or persistence level which is not the same as specified in the channel allocation information.

Deterministic allocation is the allocation in which the maximum allocated transmit power and/or data rate is specified and the WTRU 102 can transmit at any time as long as its transmit power and/or data rate does not exceed the maximum. Statistical allocation is the allocation in which in addition to the specified maximum allocated transmit power and/or data rate, persistence level (probability) is also specified. The WTRU 102 may transmit from time to time according to the persistence level or transmit at any time with transmit power and/or data rate determined by the persistence level.

The Node-B 104 computes and reports failed scheduling information reception statistics by detecting when the WTRU 102 does not initiate EU transmissions after the Node-B 104 sends the channel allocation information, or the data rate/frequency of E-DCH transmissions is not the same as specified in the channel allocation information (step 312). This may be based on a received power threshold. The WTRU 102 may also compute and report failed scheduling information reception statistics by detecting when there is no response to EU channel allocation requests within a specified time period following the transmission of the channel allocation request (step 312).

If failed transmission statistics of channel allocation information is higher than a predetermined threshold, the RNC 106 increases the transmission power offset of scheduling information field on the DL EU signaling channel 110 (step 314). The RNC 106 signals the adjusted power offset to the Node-B 104 via the Iub/Iur 118.

FIG. 4 is a flow diagram of a process 400 for controlling transmission power of a DL EU signaling channel 110 in accordance with another embodiment of the present invention. After the WTRU 102 is configured for EU operation and receives channel allocation information at step 402, the WTRU 102 transmits data via the E-DCH 108 (step 404). The Node-B 104 receives and decodes the data. The Node-B 104 then sends feedback information, (i.e., ACK or NACK), to the WTRU 102 in accordance with the decoded data (step 406).

The WTRU 102 and/or the Node-B 104 compute MAC-e failure statistics and report them to the RNC 106 to adjust NACK to ACK power ratio, (i.e., the ratio of power offsets), (step 408). In accordance with one embodiment, the WTRU 102 reports the number of MAC-e failures at the WTRU 102, which is the number of data blocks that are not transmitted successfully. A MAC-e failure occurs when a data block fails in transmission at the MAC-e due to reasons such as a maximum number of retransmissions or maximum delay of a data block is reached. The Node-B 104 reports the number of MAC-e failures of the WTRU 102 at the Node-B 104, which is the number of data blocks that are not received successfully at the MAC-e in the Node-B 104.

Sometimes, a data block that the WTRU 102 interprets as being transmitted successfully may not actually be received successfully at the Node-B 104 because a NACK of the data block is misinterpreted as an ACK at the WTRU 102. The RNC 106 determines the number of NACK to ACK misinterpretations of the WTRU 102 as the number of MAC-e failures of the WTRU 102 reported by the Node-B 104 minus the number of MAC-e failures of the WTRU 102 reported by the WTRU 102.

Alternatively, the RNC 106 may determine the number of NACK to ACK misinterpretations utilizing the number of radio link control (RLC) recovery requests of E-DCH data for the WTRU 102 at the RNC 106, which can be internally collected or computed by the RNC 106. A data block that the WTRU 102 interprets as being transmitted successfully may later have an RLC recovery request for the data due to NACK to ACK misinterpretation. The RNC 106 determines the number of NACK to ACK misinterpretations of the WTRU 102 as the number of RLC recovery requests of E-DCH data for the WTRU 102 at the RNC 106 minus the number of MAC-e failures of the WTRU 102 reported by the WTRU 102.

MAC-e failure statistics of the WTRU 102 at the WTRU 102 are reported to the RNC 106 via RRC procedures, and MAC-e failure statistics of the WTRU 102 at the Node-B 104 are reported to the RNC 106 via the Iub/Iur 118.

If the NACK to ACK misinterpretation probability is higher than a predetermined threshold, the RNC 106 increases the power ratio of the NACK to ACK power offsets (step 410). With higher power offsets, NACK will be delivered to the WTRU more reliably. The RNC 106 signals adjusted power offsets for ACK and NACK, (or power ratio between ACK and NACK), to the Node-B 104 via Iub/Iur 118, and the Node-B 104 uses the power offsets/ratio in setting the transmission power of EU DL signaling channel.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for controlling transmission power of a downlink (DL) enhanced uplink (EU) signaling channel, the method comprising:
   a radio network controller (RNC) determining EU transmission failure statistics perceived on the downlink EU signaling channel; and
   the RNC adjusting a transmission power offset for at least one of an acknowledge (ACK) message and a non-acknowledge (NACK) message transmitted over the DL EU signaling channel based on the EU transmission failure statistics,
   wherein the EU transmission failure statistics are determined by subtracting a number of EU media access control (MAC-e) failures of a wireless transmit/receive unit (WTRU) reported by the WTRU from a number of MAC-e failures of the WTRU reported by a Node-B.

2. The method of claim 1 wherein the MAC-e failures of the WTRU occur when a number of retransmissions exceeds a predetermined retransmission limit.

3. The method of claim 1 wherein the MAC-e failures of the WTRU occur when a EU transmission data expires before successfully transmitted.

4. The method of claim 1 wherein the EU transmission failure statistics are determined by subtracting the number of MAC-e failures of a wireless transmit/receive unit (WTRU) reported by the WTRU from the number of radio link control (RLC) recovery requests for the WTRU.

5. The method of claim 1 wherein the RNC sets the transmission power for the NACK message higher than transmission power for the ACK message.

6. The method of claim 1 the RNC adjusts a transmission power for EU channel allocation information.

7. The method of claim 6 wherein the EU transmission failure statistics are determined as the number of times that a Node-B receives no E-DCH transmissions from a wireless transmit/receive unit (WTRU) within a predetermined time period after the EU channel allocation information is transmitted.

8. The method of claim 6 wherein the EU transmission failure statistics are determined based on the number of times that a Node-B receives EU transmissions which are not consistent to the EU channel allocation information.

9. The method of claim 6 wherein the EU transmission failure statistics are determined based on the number of times that a wireless transmit/receive unit (WTRU) fails to receive channel allocation information from a Node-B in response to the channel allocation request within a specified time period.

10. The method of claim 1 wherein a transmission power level of the DL EU signaling channel for a specific wireless transmit/receive unit (WTRU) is determined with reference to transmission power for a DL dedicated physical control channel (DPCCH) for the specific WTRU.

11. A radio network controller (RNC) for controlling transmission power of a downlink (DL) enhanced uplink (EU) signaling channel, the RNC comprising:
    a transceiver configured to transmit and receive signals to and from a Node B; and
    a controller configured to determine EU transmission failure statistics perceived on the downlink EU signaling channel and adjust transmission power offset for at least one of an acknowledge (ACK) message and a non-acknowledge (NACK) message transmitted over the DL EU signaling channel based on the EU transmission failure statistics
    wherein the controller is configured to determine the EU transmission failure statistics by subtracting a number of EU media access control (MAC-e) failures of a wireless transmit/receive unit (WTRU) reported by the WTRU from the number of MAC-e failures of the WTRU reported by a Node-B.

12. The RNC of claim 11 wherein the MAC-e failures of the WTRU occur when the number of retransmissions exceeds a predetermined retransmission limit.

13. The RNC of claim 11 wherein the MAC-e failures of the WTRU occur when a EU transmission data expires before successfully transmitted.

14. The RNC of claim 11 wherein the controller determines the EU transmission failure statistics by subtracting the number of MAC-e failures of a wireless transmit/receive unit (WTRU) reported by the WTRU from the number of radio link control (RLC) recovery requests for the WTRU.

15. The RNC of claim 11 wherein the controller sets a transmission power for the NACK message higher than a transmission power for the ACK message.

16. The RNC of claim 11 wherein the controller adjusts a transmission power for EU channel allocation information.

17. The RNC of claim 16 wherein the controller determines the EU transmission failure statistics as the number of times that a Node-B receives no E-DCH transmissions from a wireless transmit/receive unit (WTRU) within a predetermined time period after the EU channel allocation information is transmitted.

18. The RNC of claim 16 wherein the controller determines the EU transmission failure statistics based on the number of times that a Node-B receives EU transmissions which are not consistent to the EU channel allocation information.

19. The RNC of claim 16 wherein the controller determines the EU transmission failure statistics based on the number of times that a wireless transmit/receive unit (WTRU) fails to receive channel allocation information from a Node-B in response to the channel allocation request within a specified time period.

20. The RNC of claim 11 wherein a transmission power level of the DL EU signaling channel for a specific wireless transmit/receive unit (WTRU) is determined with reference to a transmission power for a DL dedicated physical control channel (DPCCH) for the specific WTRU.

* * * * *

UNITED STATES PATENT AND TRADEMARK OFFICE
CERTIFICATE OF CORRECTION

PATENT NO. : 7,599,707 B2
APPLICATION NO. : 11/116017
DATED : October 6, 2009
INVENTOR(S) : Zhang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1197 days.

Signed and Sealed this

Twenty-eighth Day of September, 2010

David J. Kappos
*Director of the United States Patent and Trademark Office*